United States Patent
Duncan

(10) Patent No.: US 6,330,815 B1
(45) Date of Patent: Dec. 18, 2001

(54) APPARATUS AND METHOD FOR SECURELY MOUNTING A FIREARM TO A SUPPORT STRUCTURE

(75) Inventor: Steven P. Duncan, Gastonia, NC (US)

(73) Assignee: Tactical Solutions, Inc., Gastonia, NC (US)

( * ) Notice: Subject to any disclaimer, the term of this patent is extended or adjusted under 35 U.S.C. 154(b) by 0 days.

(21) Appl. No.: 09/373,015

(22) Filed: Aug. 11, 1999

(51) Int. Cl.$^7$ .................................................. E05B 59/00
(52) U.S. Cl. ......................... 70/58; 70/14; 211/4; 211/64
(58) Field of Search ................................. 70/14, 58, 18, 70/34, 202, 160; 248/551–553; 211/4, 64, 106; 42/90, 70.11; 206/317

(56) References Cited

U.S. PATENT DOCUMENTS

| | | |
|---|---|---|
| 1,513,267 | 10/1924 | Parks . |
| 2,505,227 | * 4/1950 | Charters .............................. 70/202 X |
| 2,668,645 | 2/1954 | Pease ....................................... 224/1 |
| 3,307,755 | 3/1967 | Lentz ....................................... 224/2 |
| 3,392,471 | * 7/1968 | Foote ................................ 70/202 X |
| 3,419,728 | 12/1968 | Wilson ..................................... 307/9 |
| 3,468,427 | 9/1969 | Leslie ..................................... 211/64 |
| 3,473,673 | 10/1969 | Porter ..................................... 211/64 |
| 3,507,398 | 4/1970 | Schaefer .................................. 211/4 |
| 3,566,526 | 3/1971 | Violette ................................. 40/160 |
| 3,802,612 | 4/1974 | Smith .................................. 224/1 R |
| 3,934,768 | 1/1976 | Jones .................................. 224/1 R |
| 4,084,341 | 4/1978 | Cervantes ............................... 42/14 |
| 4,155,608 | 5/1979 | Orlewicz .............................. 312/204 |
| 4,182,453 | * 1/1980 | Worswick .......................... 211/64 X |
| 4,197,951 | 4/1980 | Shassere ................................. 211/64 |
| 4,198,026 | * 4/1980 | Capolupo .............................. 70/58 X |
| 4,299,045 | 11/1981 | Cervantes ............................... 42/14 |
| 4,328,687 | * 5/1982 | Ritchie ................................ 70/58 X |
| 4,364,499 | 12/1982 | McCue .......................... 224/42.45 R |
| 4,461,385 | 7/1984 | Clouser .................................... 211/4 |
| 4,596,334 | 6/1986 | Daulton .................................. 211/64 |
| 4,624,372 | * 11/1986 | Brolin ................................ 211/64 X |
| 4,696,405 | * 9/1987 | Waring ............................... 211/64 X |
| 4,776,471 | 10/1988 | Elkins ..................................... 211/64 |
| 4,870,771 | * 10/1989 | McClellan ............................... 42/90 |
| 4,936,038 | 6/1990 | Johnson et al. ....................... 42/106 |
| 4,936,531 | * 6/1990 | Bauser ............................... 211/64 X |
| 4,949,559 | * 8/1990 | Glines ................................ 70/58 X |
| 5,138,786 | 8/1992 | Fischer .............................. 42/70.11 |

(List continued on next page.)

OTHER PUBLICATIONS

Drawing sheet for prototype dated Feb. 16, 1998.

Primary Examiner—Suzanne Dino Barrett
(74) Attorney, Agent, or Firm—Morris, Manning & Martin, LLP

(57) ABSTRACT

A mounting device for securing a firearm to a support structure such as a motor vehicle includes: a base plate defining a generally planar mounting surface; a locking pin, a guide pin, and a plurality of mounting posts extending away from the mounting surface in orthogonal relation thereto. The mounting posts primarily support the firearm and are arranged on the base plate to receive the firearm in a direction orthogonal to the mounting surface and to retain the predetermined firearm against removal from the mounting surface in directions parallel thereto. A cover plate includes an opening through which the locking pin extends and a slot through which the guide pin extends for support of the cover plate in spaced, generally parallel and overlapping relation to the mounting surface. A locking device is releasably attached to the locking pin extending through the opening such that the cover plate is releasably retained on the guide pin whereby the firearm is secured on the plurality of mounting posts between the cover plate and the mounting surface. The guide pin includes a middle neck portion having a reduced thickness and the slot in the cover member is defined by a first aperture adjacent to and intersecting with a second aperture. The first aperture is sized to allow a head portion of the guide pin to extend therethrough and the second aperture is sized to allow the neck portion to slide therein for retention of the cover member on the guide pin.

34 Claims, 7 Drawing Sheets

U.S. PATENT DOCUMENTS

| | | | |
|---|---|---|---|
| 5,271,174 | 12/1993 | Bentley | 42/70.11 |
| 5,282,539 * | 2/1994 | Saathoff | 211/64 |
| 5,309,661 | 5/1994 | Fuller et al. | 42/70.07 |
| 5,347,835 * | 9/1994 | Dewey | 70/202 |
| 5,350,070 * | 9/1994 | Stamatopoulos et al. | 211/644 |
| 5,350,094 | 9/1994 | Morford | 224/42.45 R |
| 5,438,787 * | 8/1995 | McMaster et al. | 211/64 X |
| 5,454,931 * | 10/1995 | Lauve | 211/64 X |
| 5,487,234 | 1/1996 | Dragon | 42/70.07 |
| 5,520,291 * | 5/1996 | Graham | 211/64 X |
| 5,531,368 | 7/1996 | Morford | 224/551 |
| 5,579,923 * | 12/1996 | Hemmerlein | 211/4 |
| 5,621,996 | 4/1997 | Mowl, Jr. | 42/70.07 |
| 5,680,723 * | 10/1997 | Ruiz | 70/160 X |
| 5,720,193 * | 2/1998 | Dick | 70/58 X |
| 5,787,742 * | 8/1998 | Lewis et al. | 70/14 X |
| 5,873,271 * | 2/1999 | Smith | 70/14 X |
| 5,878,929 * | 3/1999 | Leonard | 211/64 X |
| 5,927,109 * | 7/1999 | Sieck | 70/18 X |
| 6,142,313 * | 11/2000 | Young | 211/4 |

* cited by examiner

APPARATUS AND METHOD FOR SECURELY MOUNTING A FIREARM TO A SUPPORT STRUCTURE

FIELD OF THE PRESENT INVENTION

The present invention relates broadly to the secure mounting and storage of a firearm to a support structure and, more particularly, to the secure mounting and storage of a firearm to a motor vehicle.

BACKGROUND OF THE PRESENT INVENTION

Because of the wide availability of sophisticated and dangerous weaponry on the street and in the hands of today's criminals, it is becoming increasingly necessary for police forces in our communities to respond in kind by carrying more powerful and dangerous firearms, such as those having high-capacity and highspeed magazines or feeding devices, for their own protection and to provide a greater deterrence to those criminals. For example, police forces now commonly purchase sub-machine guns and, in addition, the United States government recently began loaning excess military machine guns, such as the Colt M16, to police forces across the country for their use in combating this increasingly-dangerous criminal element. However, because high-capacity and high-speed magazines are no longer available to the general public, because of the potential risk that such weapons or the high-capacity or high-speed magazines used with such weapons could be stolen from police cars by the very criminal element the police are trying to combat, and because of the potential civil liability that could arise if such weapons or magazines were later used in the commission of a crime, police superiors have been hesitant to allow such weapons and magazines to be carried routinely by officers in their vehicles. Instead, most of these highly-sophisticated firearms remain locked up in storage at the police stations. In some cases, a police officer can sign out one of these weapons if he knows, beforehand, that such fire power may be needed; however, in most cases, such a weapon is needed in an emergency situation when there is not sufficient time to remove the weapon from storage.

In order to facilitate the use of such higher power firearms by law enforcement, a mounting device is required which securely retains such a high power firearm within vehicles in a relatively safe manner free from tampering or unauthorized removal. Such mounting device should be particularly suited to securely retain a firearm and prevent access to the operational elements of the firearm, such as the high-capacity and/or high-speed feeding device or magazine. Furthermore, the mounting device should be easily and relatively permanently mounted to a wall within the cabin or trunk of a vehicle, such as a police car. The mounting device should also be sturdy in construction, not overly cumbersome or difficult to use, and relatively inexpensive to manufacture. The mounting device should also use a manual keyed lock, rather than an electrical lock, which is easier to by-pass, or a combination lock, which is more difficult to open when the user is experiencing high stress, tension, heart rate, and/or adrenaline rush, as may be the case with a police officer attempting to thwart a crime in progress. There is a further need for a weapon-mounting device and associated locking mechanism, neither of which can be easily overcome by the application of direct blunt force impact, prying with a crowbar or similar device, or bolt cutting. The preferred embodiments of the present invention as set forth below are intended to address these needs.

BRIEF SUMMARY OF THE INVENTION

Briefly described, the present invention includes: a support structure having a generally planar mounting location; at least one elongate member integral with and extending away from the support structure; a cover member having an opening through which one elongate member extends in generally orthogonal relation to the support structure; and a locking device releasably attached to the elongate member extending through the opening in the cover member such that the cover member is releasably secured in overlapping relation to the support structure for retention of the firearm when disposed between the cover member and the support structure. The support structure itself preferably comprises a wall of a motor vehicle that is preferably located in a trunk of the vehicle and includes a base member defining a generally planar mounting surface and having a back plate with padding. The cover member preferably includes a cover plate with padding disposed in spaced, parallel relation to the mounting location.

In features of the present invention, the mounting device includes a plurality of elongate members extending parallel to one another, including a locking pin and a plurality of elongate support members, the support members in turn including a guide pin for support of the cover member and a plurality of support posts for support of the firearm. The locking pin extends through the opening in the cover member for engagement with the locking device, which preferably comprises a single post meter lock. Furthermore, the locking device is preferably only attached to the cover through its releasable attachment to the locking pin. The slot pin extends through an interlocking slot formed in the cover member and includes a neck portion having a reduced thickness disposed between a head portion and a shaft portion. The interlocking slot itself is defined by the intersection of a first aperture through which the head portion is extendable with a second aperture within which the neck portion is displaceable but through which neither the neck portion nor the shaft portion are displaceable. Positioning of the neck portion within the narrower aperture defining the interlocking slot thereby locks the cover member against movement along the guide pin without first repositioning the guide pin through the larger aperture of the interlocking slot.

In other features of the present invention, either the locking pin or the guide pin, or both pins, support the firearm whether or not mounting posts are also provided. Each elongate member also includes a resilient sleeve such as a rubber sleeve for resilient, non-damaging contact with the firearm.

In yet further features of the present invention, the locking device includes a single post meter lock that fits over the end of the locking pin and, preferably, the locking device is dimensioned so that the locking device cannot be passed through the opening in the cover through which the locking pin extends; the cover member includes a guard member comprising a substantially cylindrical sleeve integral with and extending from the cover member and disposed in surrounding relation to the portion of the locking pin extending through the cover member, with the locking device being disposed within the cylindrical sleeve for protection of the locking device; a second guard member is included on the cover member similarly protecting the portion of the guide pin extending through the interlocking slot; and the cover member includes a clearance slot for the protrusion therethrough of a portion of the firearm.

The present invention also includes the method of securing a firearm to support structure, including the steps of: (1)

disposing a firearm adjacent the support structure in proximity to an elongate member integral with and extending away from the support structure; (2) placing the cover member into covering relation to the firearm with a distal end portion of the elongate member extending in generally orthogonal relation to the support structure through an opening defined in the cover member, including (a) guiding transversely through a first portion of a slot defined in the cover member a second elongate member integral with and generally orthogonal to the support structure, the slot having a narrower second portion and the second elongate member including a recessed neck portion disposed between a shaft portion and a head portion, and then (b) sliding the cover member in a direction parallel to the support structure such that the recessed neck portion is disposed through the narrower second portion of the slot whereby the cover plate is fixedly retained on the second elongate member against movement orthogonal to said support structure; and (3) releasably attaching a locking device to the distal end portion of the elongate member such that the cover member is releasably secured in covering relation to the firearm disposed between the cover member and the support structure.

BRIEF DESCRIPTION OF THE DRAWINGS

For a more complete understanding of the present invention, reference should now be had to the accompanying drawings wherein:

FIG. 12 is an elevational view of the front of the base of FIG. 8 having a firearm mounted thereon.

DETAILED DESCRIPTION OF PREFERRED EMBODIMENTS

Figure 1:
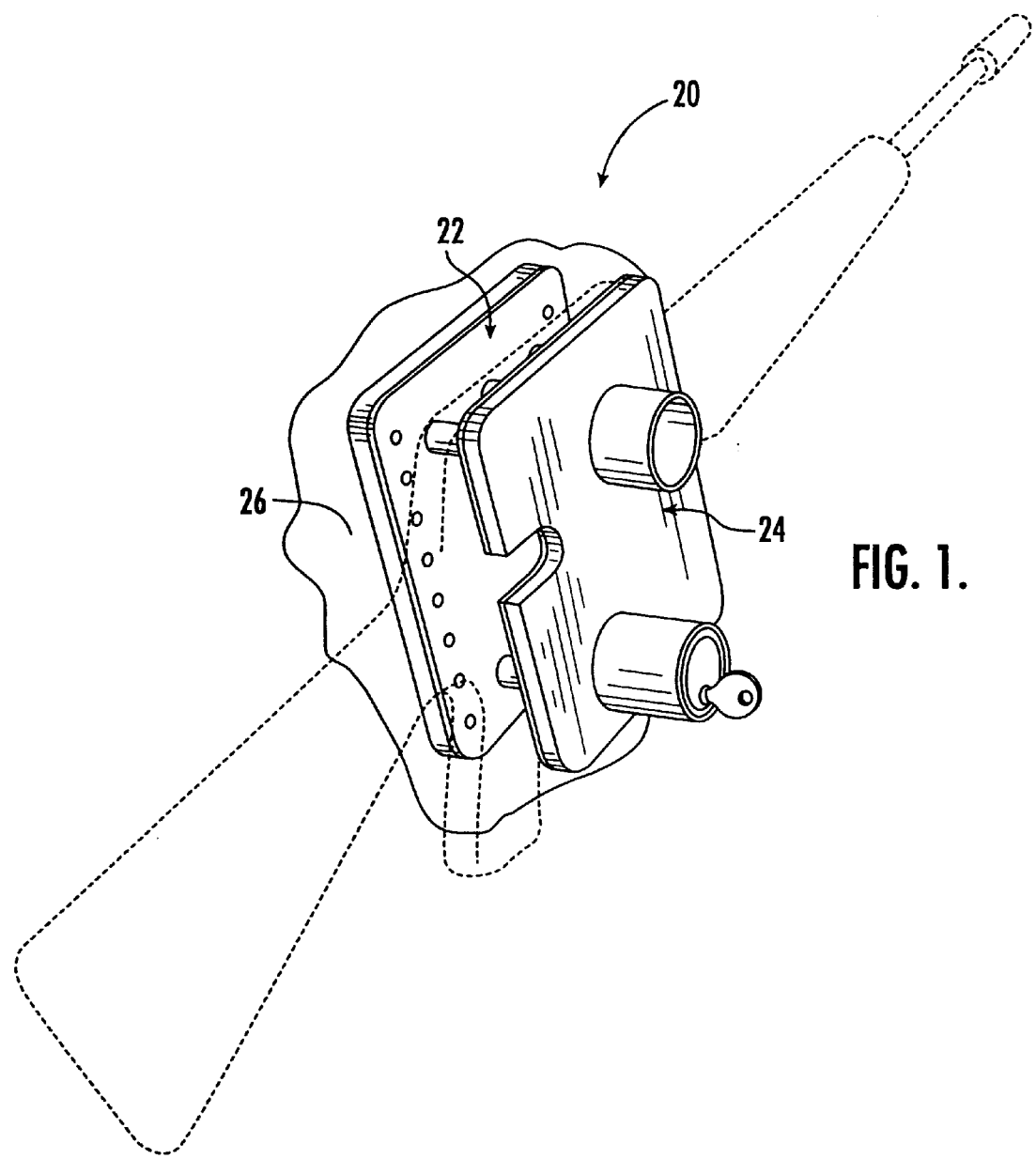
FIG. 1 is a perspective view of a preferred embodiment of the mounting apparatus of the present invention secured to a support structure.
Figure 2:
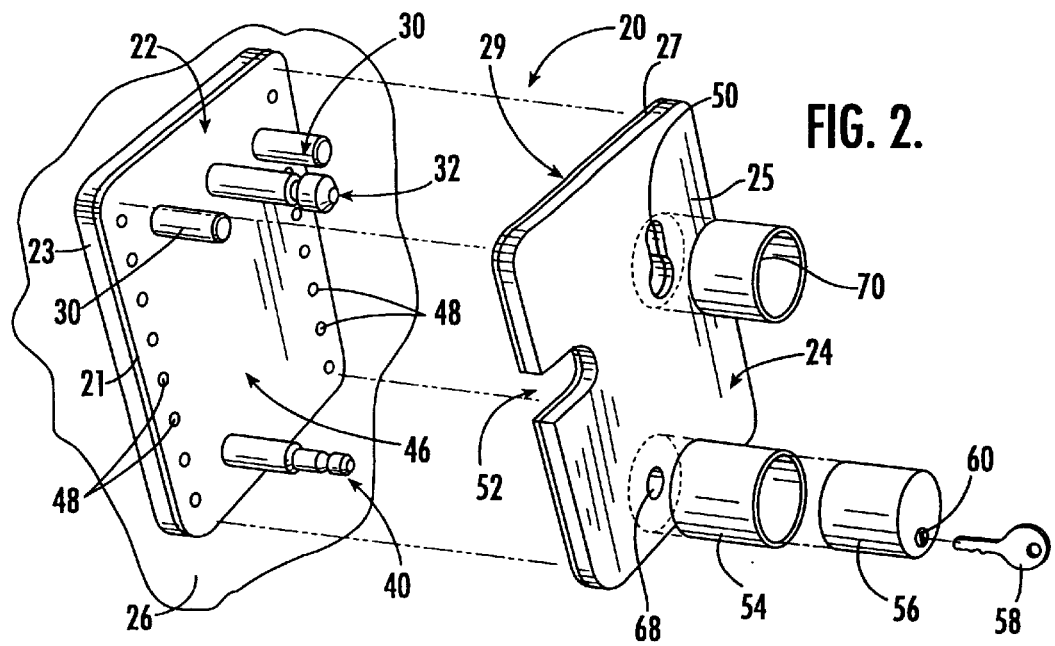
FIG. 2 is an exploded perspective view of the mounting apparatus of FIG. 1.
Figure 3:
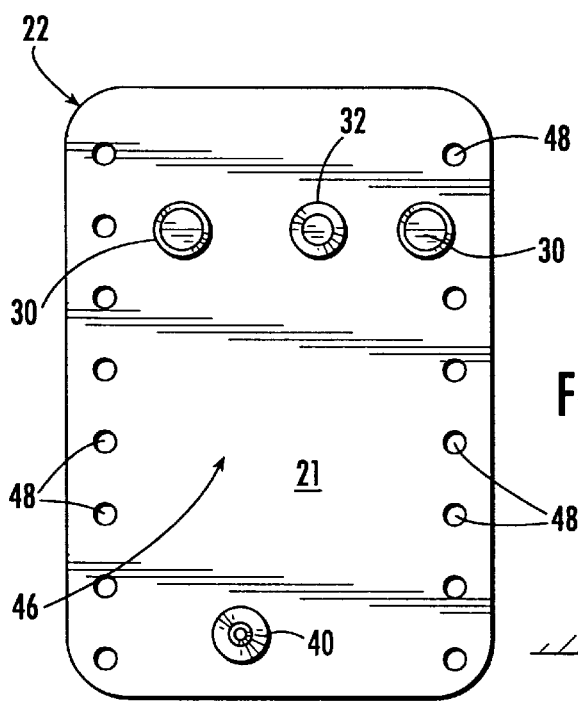
FIG. 3 is an elevational view of the front of the base of the mounting apparatus of FIG. 2.
Figure 4:
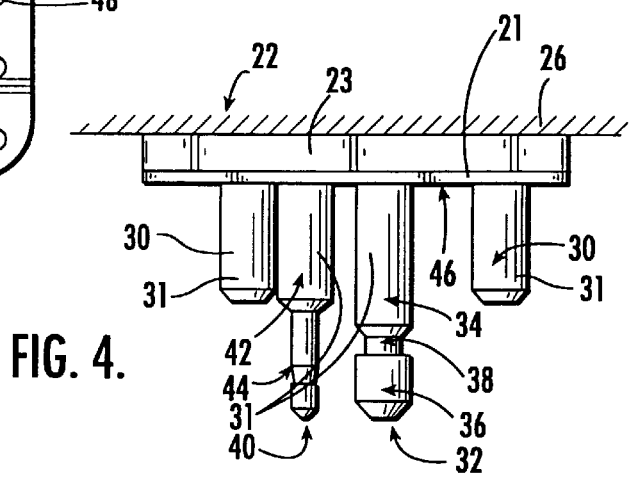
FIG. 4 is a plan view of the top of the base of FIG. 3.
Figure 5:
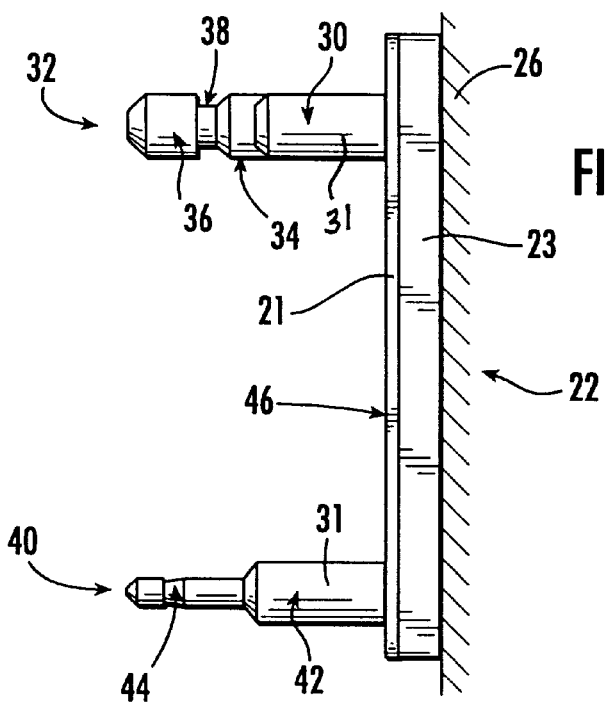
FIG. 5 is an elevational view of a side of the base of FIG. 3.
Figure 6:
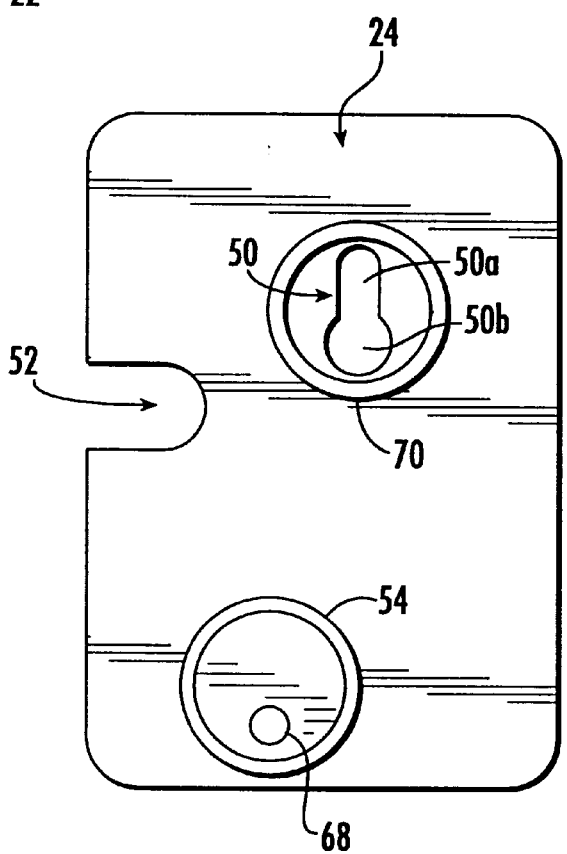
FIG. 6 is an elevational view of the front of the cover of the mounting apparatus of FIG. 2.

As shown in FIG. 1, a first preferred embodiment 20 of the mounting apparatus of the present invention is designed to secure a Colt M-16 .223 caliber rifle (shown in phantom) and, as shown in exploded view in FIG. 2, the first preferred embodiment 20 includes a base 22, a cover 24, and a lock 56 and a key 58. The base 22 is mounted to a support structure 26 such as the inside wall of a vehicle trunk or the interior wall of a van and, as shown in FIG. 1, when the rifle is mounted on the base 22, the cover 24 is locked in spaced, parallel disposition to the base 22 with the rifle securely retained therebetween.

With reference to FIGS. 3–6, the base 22 comprises a rectangular-shaped base plate 23 constructed of a high-strength and high-integrity metal such as carbon steel or stainless steel. Padding 21 comprising foam or rubber is affixed to the base plate 23 to define a generally planar mounting surface 46 adjacent which the rifle is received. The base 22 includes two elongate, cylindrical posts 30 as well as an elongate, cylindrical guide pin 32 and an elongate, cylindrical locking pin 40, each orthogonal to the mounting surface 46 and each made from a high-strength metal such as carbon steel or stainless steel. Posts 30 and pins 32,40 are formed separately from base plate 23 and each include a flanged base (not shown), with each post 30 and pin 32,40 respectively extending through corresponding holes (not shown) formed in padding 21 and base plate 23 and with each flanged base thereof being disposed in abutment with and welded to the base plate 23. Guide pin 32 includes a shaft portion 34, a head portion 36, and a neck portion 38, the diameter of the neck portion 38 being less than the diameters of the shaft and head portions 34,36, respectively. Locking pin 40 includes a shaft portion 42 and a shackle portion 44. Posts 30, the shaft portion 34 of guide pin 32, and the shaft portion 42 of locking pin 40 each include a rubber sleeve 31 for engagement of the rifle as described in detail below. Padding 21 and base plate 23 also define multiple apertures 48 through which bolts (not shown) extend for securement of the base plate 23 to the support structure 26. Furthermore, the bolts are welded into place to provide greater strength and security to the abutment between base plate 23 and support structure 26.

The cover 24 comprises a rectangular-shaped cover plate 25 constructed of a high-strength and high-integrity metal such as carbon steel or stainless steel, and includes padding 27 affixed to the cover plate 25 to define a generally planar surface 29. The cover plate 25 and padding 27 define a clearance slot 52 and an interlocking slot 50. Interlocking slot 50 includes two intersecting apertures 50a,50b extending through cover plate 25. Furthermore, aperture 50b is larger in dimension that aperture 50a such that the shaft portion 34 and head portion 36 of guide pin 32 are extendable through aperture 50b but not through aperture 50a; the neck portion 38 of guide pin 32, however, is extendable within aperture 50a.

The cover 24 also includes two guard members 54,70 made of a highstrength and high-integrity metal such as carbon steel or stainless steel. Each guard member 54,70 is fixedly mounted to a front surface of the cover plate 25 and comprises a cylindrical wall, which defines a channel therein. In particular, each guard member 54,70 extends in abutment with and is welded, preferably inside the channel, to the cover plate 25. The guard member 54 is positioned about a locking pin aperture 68 defined by the cover plate 25 and padding 27 for receipt therethrough of the locking pin 40; guard member 54 thereby protects against tampering with the locking device as described in greater detail below. Guard member 70, on the other hand, protects against tampering with the guide pin 32 in its disposition through interlocking slot 50.

The first preferred embodiment 20 also includes a lock 56 and key 58 combination. The lock 56 comprises a solid brass, single post meter lock as manufactured, for example, by the Wilson Bohannan Company of Marion, Ohio, and identified as model numbers 402, 412, or 482. As is conventional, the lock 56 includes a keyhole 60 on its face into which key 58 fits and, as more fully described below, the lock 56 is designed for disposition within the guard member 54 of the cover 24 and releasably receives the shackle portion 44 of locking pin 40 therein. Furthermore, the diameter of the cylindrical body of the lock 56 is greater than the diameter of the locking pin aperture 68 in cover plate 25 such that the lock 56 is prevented from sliding through the cover plate 25 and padding 27.

Figure 7:
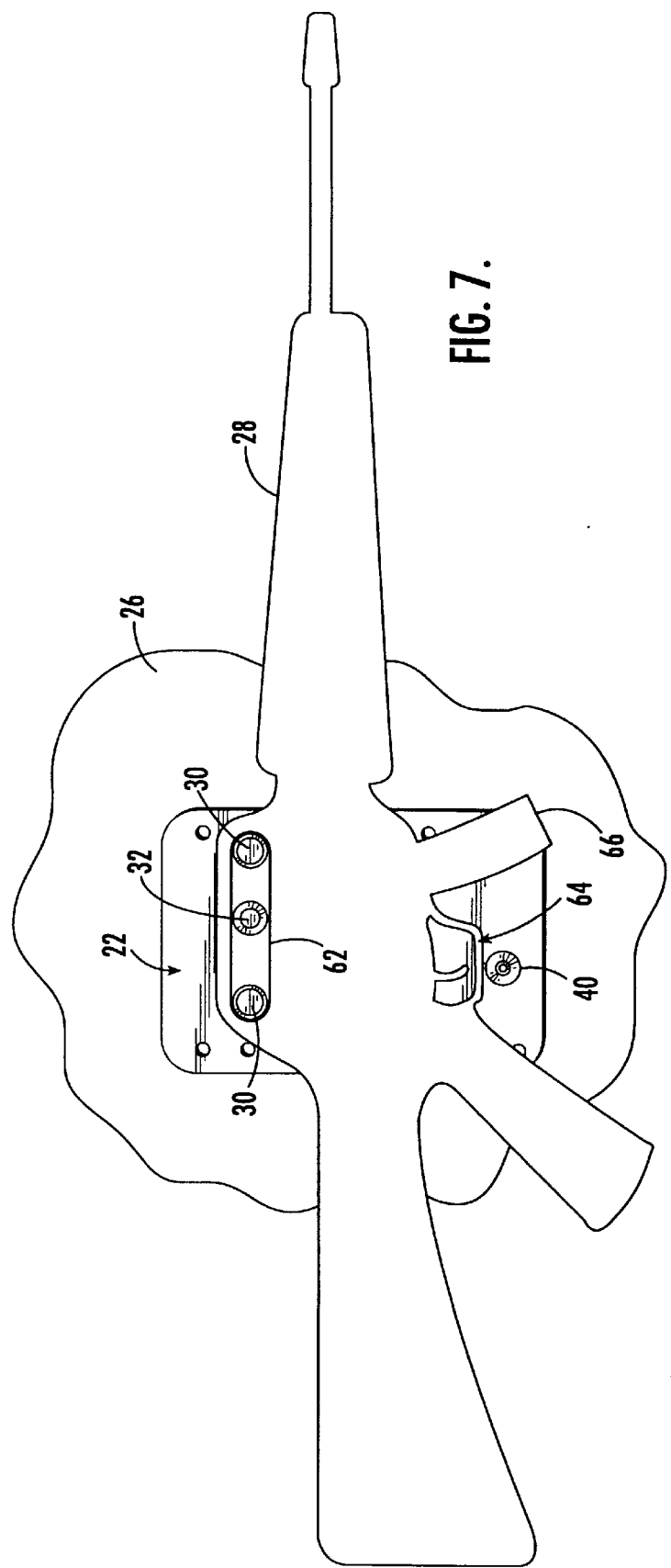
FIG. 7 is an elevational view of the front of the base of FIG. 1 having a firearm mounted thereon.
Figure 8:
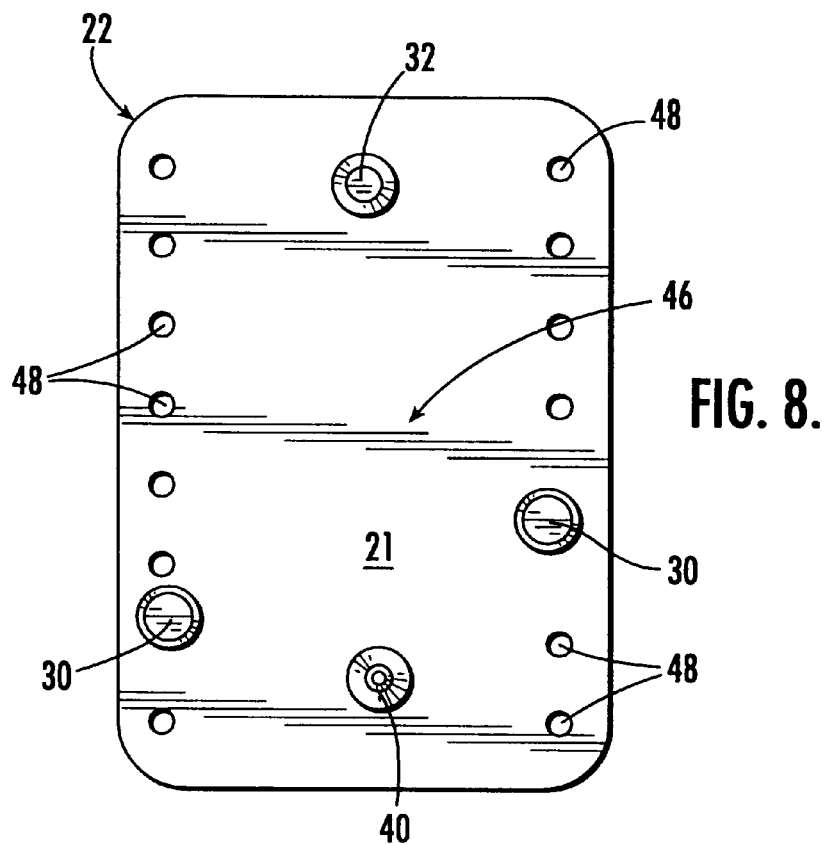
FIG. 8 is an elevational view of the front of the base of a second preferred embodiment of the mounting apparatus of the present invention.
Figure 9:
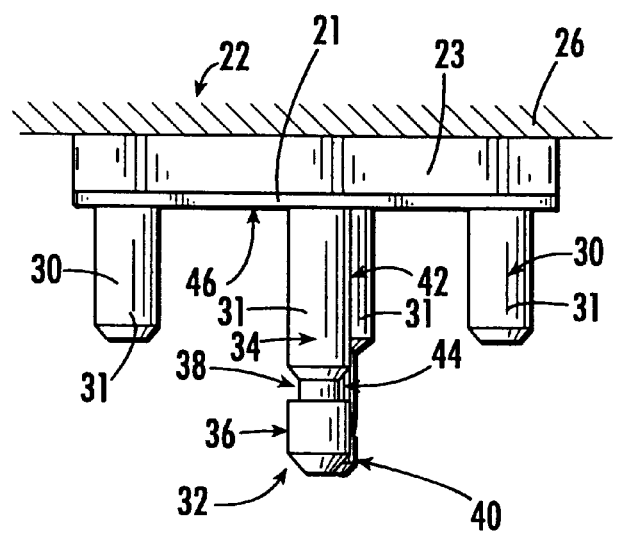
FIG. 9 is a plan view of the top of the base of FIG. 8.
Figure 10:
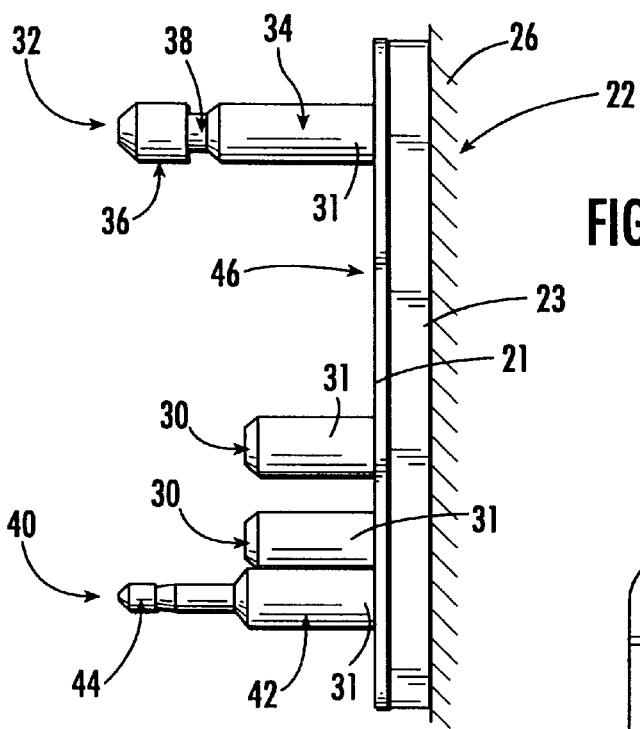
FIG. 10 is an elevational view of a side of the base of FIG. 8.
Figure 11:
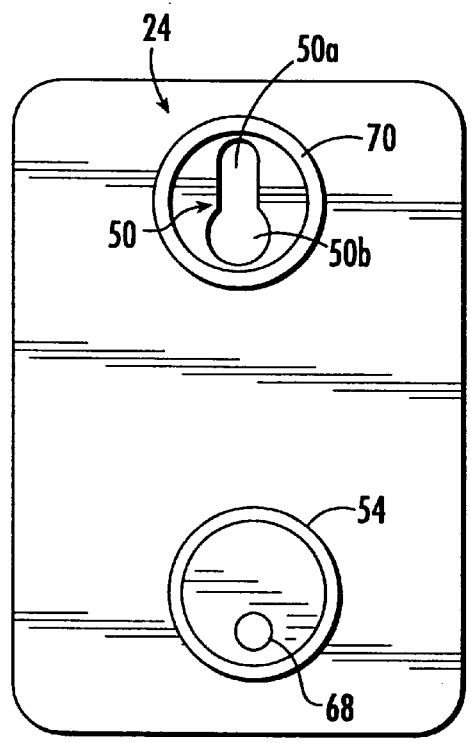
FIG. 11 is an elevational view of the front of the cover for use with the base plate of FIG. 8.
Figure 72:
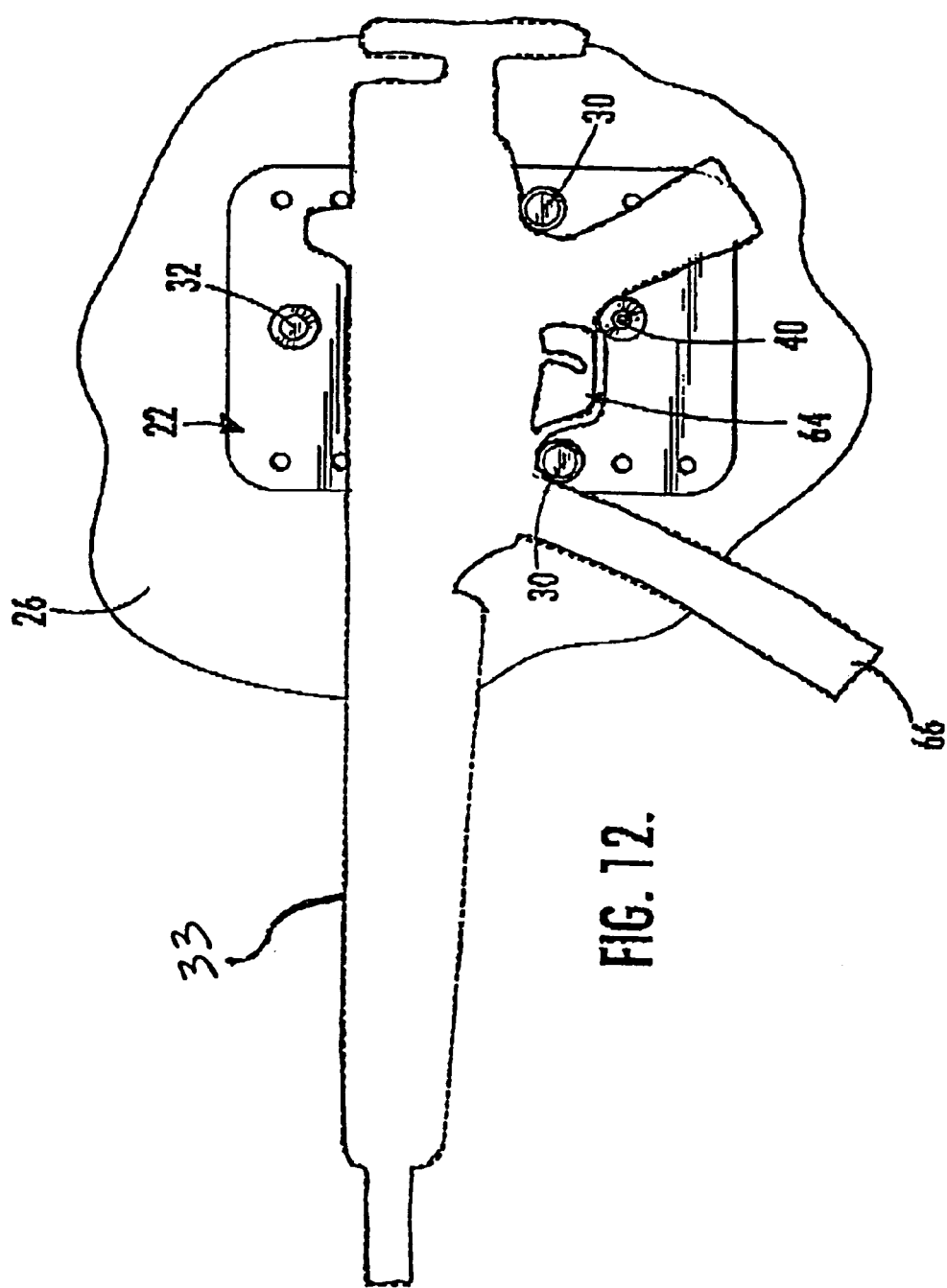

In mounting the rifle onto the base 22 as shown in FIG. 7, a Colt M-16 .223 caliber rifle 28 is positioned such that each post 30 extends through the handgrip 62 whereby the firearm 28 is supported by engagement of the handgrip 62 with the rubber sleeve 31 each post 30. Furthermore, the posts 30 are configured specifically for the handgrip 62 of the firearm 28 whereby the posts 30 engage the interior ends of the handgrip 62 such that the weapon is blocked not only against rotational movement but also against transverse movement. Furthermore, the handgrip 62 also abuts the rubber sleeve 31 of the shaft portion 34 of guide pin 32 for additional support.

The firearm 28 is retained in its mounted position by the cover 24. Specifically, the cover 24 is positioned onto the base 22 by disposing the head portion 36 of the guide pin 32 fully through aperture 50b and then displacing the cover 24 transverse to the base 22 such that the neck portion 38 of the guide pin 32 is disposed within aperture 50a. Since the diameters of the shaft portion 34 and head portion 36 of the guide pin 32 are not extendable through aperture 50a, the cover 24 is thereby restricted in its movement both away from and toward the base 22. Furthermore, the thickness of the cover plate 25 and padding 27 preferably corresponds to the length of the neck portion 38 whereby the cover plate is snugly received between the shaft portion 34 and the head portion 36 such that the cover 24 is immobilized against movement both away and toward the base 22. When properly positioned, cover plate 25 will be disposed in parallel, overlapping relation to the base plate 23 at a spacing that permits the firearm 28 to be lightly engaged by the padding 21 and padding 27 of the base 22 and cover 24, respectively. The cover plate 25 includes the clearance slot 52 whereby the forward assist mechanism for the rifle bolt of firearm 28 is permitted to extend beyond the cover plate 25 for proper disposition of the cover plate 25 in relation to the base 22.

To secure the firearm 28 and its operational elements against unauthorized access, the lock 56 is disposed within the channel of the guard member 54 and the locking pin 40 is arranged on the base 22 such that it extends through the locking pin aperture 68 into the channel of the guard member 54 with the shackle portion 44 thereof being engagingly received within the lock 56. The lock 56 extends completely within the guard member 54 whereby it is protected against forcible removal. Furthermore, the guard member 54 is dimensioned to receive the lock 56 in close fit therewith such that the cover 24 is precluded from movement parallel to the base 22 for repositioning of the neck portion 38 of the guide pin 32 within aperture 50b. The lock 56 thereby prevents removal of the cover 24 from the base 22. Furthermore, as shown in FIG. 7, the cover plate 25 of the cover 24 has a sufficient size to preclude access to operational elements of the firearm 28 such as the trigger, safety, magazine well, magazine release, chamber, and sighting. Not only is the weapon thus secured against unauthorized access by the cover 24, but it is also secured against tampering.

In the first preferred embodiment 20, the locking pin 40 also is arranged to extend below the trigger guard 64 of the firearm 28 adjacent the magazine 66. While pin 32 and posts 30 sufficiently support and restrict lateral movement of firearm 28 in this embodiment, the rubber sleeve 31 of the shaft portion 42 of the locking pin 40 nevertheless extends in abutment with the trigger guard 64 for further support thereof against movement.

FIGS. 8–12 illustrate another preferred embodiment of the mounting apparatus of the present invention designed specifically for use with a Heckler & Koch MP5 9 mm rifle 33, this additional preferred embodiment differing from the first preferred embodiment 20 in the omission of the clearance slot 52 which is unnecessary to accommodate the rifle 33 and in the configuration of the posts 30 and pins 32,40 on the base 22. Indeed, as shown in FIG. 12, the posts 30 and locking pin 40, in this particular configuration, abut and support the rifle 33 such that transverse and rotational movement of the rifle 33 is prevented, while guide pin 32 extends out of abutment with the rifle 33.

In view of the first and second embodiments disclosed in the Figs., it will be readily apparent to those persons skilled in the art that the posts 30 and pins 32,40 may be readily arranged on base 22 (and corresponding apertures 50,68 on cover 24) to accommodate a multiplicity of other firearms having different shapes, sizes, and arrangements of operational elements. In addition, the size and shape of the base 22 and cover 24 may be readily modified to accommodate various types of firearms having different attachments or operational elements.

Thus, for one example, with other embodiments of the present invention for use with differently-shaped firearms, one or more clearance slots 52 may be located elsewhere in cover plate 25 or even in base plate 23 to more easily accommodate the shape and operational elements of a particular firearm. Alternatively, as shown in the second preferred embodiment of the Figs., a clearance slot 52 may not even be necessary and may, therefore, be omitted.

As another example, the cover 24 could be round in shape as opposed to rectangular, provided the cover 24 be large enough to sufficiently cover all of the operational elements of a particular firearm when rotated. Moreover, in such an embodiment, the guide pin 32 and interlocking slot 50 could be omitted.

It is also contemplated within the present invention that a handle could be attached to the outside of cover 24 for ease in placing and removing cover 24 from base 22.

Furthermore, while the posts 30 are shown as being shorter in length than the pins 40,42, it is contemplated within the present invention that the posts could extend either into abutment with the interior surface of cover 24 when secured onto the base 22 or even through holes provided in the cover 24 for extension therethrough of the posts 30. It also is contemplated that mounting posts 30 could be replaced with any other suitably shaped or dimensioned member(s) for receiving and holding a firearm in place relative to the mounting location 46.

It is also contemplated that posts 30, guide pin 32, and locking pin 40 could be integrally formed or securely fastened directly to support structure 26 without the use of base plate 23. In the preferred embodiments, however, the use of base plate 23 not only allows attachment to an existing support structure such as a trunk wall of a police vehicle already in service but also permits an individual to choose an appropriate location for securing the mount to the support structure 26. In this case posts 30 and pins 32,40 could be formed as part of the base plate 23. Moreover, the guard members 54,70 could be formed as part of the cover plate 25.

The use of a meter lock in the present invention is preferable because of its simplicity, relative strength, and ease of use. Although other types of conventional locks, such as combination, electrically-actuated, keypad, or padlock locks, could be used with the present invention, a meter lock is the easiest for an authorized user to access and remove during stressful or emergency situations without having the drawbacks of being able to easily circumvent mechanically or electrically. The meter lock 56 is easy to shield from unauthorized access and tampering by using a guard member 54.

When mounted in the trunk of a police vehicle, it is preferred that the locking pin 40 and lock 56 will be oriented closer to the floor of the trunk than guide pin 32 and interlocking slot 50. Such an arrangement not only makes it easier to slide the neck portion 38 of guide pin 32 into aperture 50*a* via gravity, but also makes it more difficult to forcibly remove the lock 56 from guard member 54 without key 58.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An apparatus for securing a firearm having operational elements, comprising:
    a support structure;
    at least one elongate member integral with and extending away from said support structure;
    a cover member having an opening through which one of said at least one elongate member extends in generally orthogonal relation to said support structure, said cover member shaped to cover the operational elements of the firearm; and
    a locking device separate from said cover member and releasably attached to said elongate member extending through said opening in said cover member such that said locking device engages an outer surface of said cover member and maintains said cover member in overlapping relation to said support structure for retention of the firearm when the firearm is disposed between said cover member and said support structure.

2. An apparatus for securing a firearm according to claim 1, wherein said elongate member extending through said opening supports the firearm.

3. An apparatus for securing a firearm according to claim 1, wherein said support structure includes a base plate affixed thereto, each one of said at least one elongate members being affixed to said base plate.

4. An apparatus for securing a firearm according to claim 1, wherein said support structure defines a generally planar mounting location and said cover member includes a cover plate disposed in generally spaced, parallel relation to said mounting location.

5. An apparatus for securing a firearm according to claim 1, wherein said support structure comprises a motor vehicle.

6. An apparatus for securing a firearm according to claim 1, wherein said support structure comprises an interior wall of a motor vehicle.

7. An apparatus for securing a firearm according to claim 6, wherein said interior wall is disposed in a trunk of the motor vehicle.

8. An apparatus for securing a firearm according to claim 1, wherein said cover member includes a cover plate having padding attached thereto and disposed toward said support structure for abutment with the firearm.

9. An apparatus for securing a firearm according to claim 1, wherein said locking device fits over an end of said elongate member extending through said opening.

10. An apparatus for securing a firearm, comprising:
    a base member securely attachable to a support structure, said base member including a mounting surface and an elongate locking pin extending away from said mounting surface;
    a cover member including a first opening through which a portion of said locking pin extends;
    an elongate support member integral with and extending away from said base member, a portion of said elongate support member engaging a second opening in said cover member; and
    a locking device releasably attached to said portion of said locking pin extending through said first opening such that said cover member is releasably retained on said elongate support member in overlapping relation to said mounting surface for retention of the firearm when the firearm is disposed between said cover member and said base member.

11. An apparatus for securing a firearm according to claim 10, wherein said locking device is dimensioned such that said locking device cannot be passed through said opening in said cover member when releasably attached to said locking pin, whereby said cover member is releasably retained by said locking device.

12. An apparatus for securing a firearm according to claim 10, wherein said locking pin supports the firearm.

13. An apparatus for securing a firearm according to claim 10, wherein said elongate support member includes an elongate guide pin integral with and extending away from said base member and said second opening comprises a slot defined by said cover member through which said guide pin extends, said guide pin comprising a shaft portion connected to a neck portion connected to a head portion, said slot in said cover member comprising a first aperture adjacent to and intersecting with a second aperture, said first aperture sized to allow said head portion of said guide pin to extend therethrough and said second aperture sized to allow said neck portion to slide therein but to block said head portion and said shaft portion from sliding therethrough such that said cover member is fixedly supported by said guide pin against movement in a direction orthogonal to said mounting surface.

14. An apparatus for securing a firearm according to claim 13, wherein said guide pin further supports the firearm.

15. An apparatus for securing a firearm according to claim 13, wherein said cover member further includes a guard member integral with and extending away from said cover plate about said slot.

16. An apparatus for securing a firearm according to claim 10, further comprising at least one mounting post for support of the firearm.

17. An apparatus for securing a firearm according to claim 10, wherein said locking device comprises a single post meter lock.

18. An apparatus for securing a firearm according to claim 10, wherein said cover member further includes a clearance slot dimensioned to receive therethrough a portion of the firearm.

19. An apparatus for securing a firearm according to claim 10, wherein said locking device is attached to said cover only through said releasable attachment of said locking device to said locking pin.

20. An apparatus for securing a firearm according to claim 10, wherein said cover member includes a cover plate having a generally planar surface disposed substantially parallel to said mounting surface.

21. An apparatus for securing a firearm according to claim 18, wherein said planar surface of said cover plate is disposed toward said mounting surface and said planar surface and said mounting surface are padded.

22. An apparatus for securing a firearm according to claim 10, wherein said cover member further includes a cover plate defining said first opening and a guard member integral with and extending away from said cover plate about said first opening, said guard member defining an interior channel and said locking device being disposed within said channel of said guard member in said releasable attachment to said portion of said locking pin extending through said first opening.

23. An apparatus for securing a firearm according to claim 22, wherein said guard member substantially surrounds said locking device.

24. An apparatus for securing a predetermined firearm to a support structure, comprising:
a base plate securely attachable to the support structure, said base plate defining a generally planar mounting surface;
an elongate locking pin integral with and extending away from said mounting surface in orthogonal relation thereto;
an elongate guide pin integral with and extending away from said mounting surface in orthogonal relation thereto, said elongate guide pin in spaced parallel relation to said elongate locking pin;
a plurality of mounting posts integral with and extending away from said mounting surface for support of the firearm, said plurality of mounting posts being arranged on said base plate to receive and support the predetermined firearm in a direction orthogonal to said mounting surface and to retain the predetermined firearm against removal from the mounting surface in a direction parallel to said mounting surface;
a cover plate including an opening through which a portion of said locking pin extends, and a slot through which a portion of said guide pin extends for support of said cover plate, said cover plate being disposed on said guide pin in spaced, generally parallel and overlapping relation to said mounting surface; and
a locking device releasably attached to said portion of said locking pin extending through said opening such that said cover plate is releasably retained on said guide pin whereby the predetermined firearm is secured on said plurality of mounting posts between said cover plate and said mounting surface.

25. An apparatus for securing a predetermined firearm to a support structure according to claim 24, wherein said plurality of mounting posts extend from said mounting surface parallel to said locking pin and said guide pin.

26. An apparatus for securing a predetermined firearm to a support structure according to claim 24, wherein said cover plate is further disposed in covering relation to ends of said plurality of mounting posts.

27. An apparatus for securing a predetermined firearm to a support structure according to claim 24, wherein said guide pin comprises a shaft portion connected to a neck portion connected to a head portion and said slot in said cover member comprising a first aperture adjacent to and intersecting with a second aperture, said first aperture sized to allow said head portion of said guide pin to extend therethrough and said second aperture sized to allow said neck portion to slide therein but to block said head portion and said shaft portion from sliding therethrough such that the cover member is fixedly supported by said guide pin against movement in a direction orthogonal to said mounting surface.

28. An apparatus for securing a predetermined firearm to a support structure according to claim 24, wherein said locking pin includes a resilient sleeve for support of the firearm.

29. An apparatus for securing a predetermined firearm to a support structure according to claim 24, wherein said guide pin includes a resilient sleeve for support of the firearm.

30. An apparatus for securing a predetermined firearm to a support structure according to claim 24, further comprising a guard member integral with and extending from said cover plate and surrounding said opening through which said locking pin extends.

31. An apparatus for securing a predetermined firearm to a support structure according to claim 24, further comprising a guard member integral with and extending from said cover plate and surrounding said slot through which said guide pin extends.

32. A method for securing a firearm to a support structure comprising the steps of:
disposing a firearm adjacent the support structure in proximity to an elongate locking pin and an elongate support member, the locking pin and support member integral with and extending away from the support structure;
placing a cover member into covering relation to the firearm with a distal end portion of the elongate locking pin extending in generally orthogonal relation to the support structure through an opening defined in the cover member and with a distal end portion of the support member releasably engaging a slot defined in said cover member; and
releasably attaching a locking device to the distal end portion of the elongate locking pin such that the cover member is releasably secured in covering relation to the firearm disposed between the cover member and the support structure.

33. The method of claim 32, wherein said step of placing the cover member into covering relation to the firearm includes,
guiding transversely through a first portion of the slot defined in the cover member the support member, the slot having a narrower second portion and the support member including a recessed neck portion disposed between a shaft portion and a head portion, and then
sliding the cover member in a direction parallel to the support structure such that the recessed neck portion is disposed through the narrower second portion of the slot whereby the cover plate is fixedly retained on the support member against movement orthogonal to said support structure.

34. An apparatus for securing a firearm to a support structure, comprising:
- a base member securely attachable to the support structure, said base member including a mounting surface;
- an elongate locking pin integral with and extending away from said mounting surface in orthogonal relation thereto;
- an elongate guide pin integral with and extending away from said mounting surface in orthogonal relation thereto;
- at least one support member integral with and extending away from said mounting surface in a location to support the firearm in a direction orthogonal to said mounting surface and to retain the firearm against removal from the mounting surface in a direction parallel to said mounting surface;
- a cover plate including an opening through which a portion of said locking pin extends and a slot through which a portion of said guide pin extends for support of said cover plate, said cover plate being disposed on said guide pin in spaced, generally parallel relation to said mounting surface and in overlapping relation to said elongate locking pin, said elongate guide pin, and said at least one support member; and
- a locking device releasably attached to said portion of said locking pin extending through said opening such that said cover plate is releasably retained on said guide pin whereby the firearm is secured on said at least one support member between said cover plate and said mounting surface.

* * * * *